April 19, 1955　　J. W. JACOBSON　　2,706,383
CONTROL FOR GAS TURBINE POWER PLANT
Filed Dec. 15, 1949　　2 Sheets-Sheet 2

Inventor:
John W. Jacobson,
by Ernest C. Britton
His Attorney.

United States Patent Office 2,706,383
Patented Apr. 19, 1955

2,706,383

CONTROL FOR GAS TURBINE POWER PLANT

John W. Jacobson, Schenectady, N. Y., assignor to General Electric Company, a corporation of New York Application December 15, 1949, Serial No. 133,066

22 Claims. (Cl. 60—35.6)

This invention relates to control systems for gas turbine power plants and more particularly to a control system for an aircraft gas turbine power plant having exhaust reheating for augmentation of thrust.

A gas turbine power plant for the propelling of aircraft may include an air compressor for initially increasing the pressure of the incoming air, combustion apparatus for burning fuel in the compressed air, and a gas turbine arranged in series flow relation with the compression and combustion apparatus through which the hot, high pressure gas generated by the compressor and combustion apparatus is expanded. The turbine extracts at least sufficient power from the gas to drive the compressor and the power remaining may be used to produce thrust for propelling the aircraft by discharging the gases exhausted from the turbine rearwardly through a suitable nozzle. Aircraft gas turbine power plants of this type are more particularly described in Patent 2,432,359 to Dale D. Streid, and in application Serial No. 541,565, filed June 22, 1944, of Alan Howard, both assigned to the assignee of the present application.

In the design of gas turbine power plants, particularly for high performance aircraft, it may be desirable to provide means for augmenting the thrust during short periods of time. Various methods for augmenting thrust have been utilized including the exhaust reheating cycle, described in co-pending application Serial No. 80,696, filed March 10, 1949, of Edward Woll, assigned to the assignee of the present application. In this cycle, additional fuel is injected downstream from the turbine and burned in the tailpipe. The thrust available for propelling the aircraft is a function of the velocity of the hot gases flowing through the jet nozzle at the rear of the power plant and thus, the thrust may be augmented by increasing the velocity of the flow of hot gases through this jet nozzle. This increase in velocity is effected by the tailpipe fuel burning which increases the temperature of the hot gases after they are discharged from the turbine and prior to the final discharge from the propelling nozzle. This tailpipe burning may yield a turbine discharge gas temperature which can approach 3,000° F. The resulting high velocity of the gas discharged through the jet nozzle can produce a net thrust increase for augmentation of up to 45% at take-off and 90% in high-speed flight.

The tailpipe fuel burning does not directly affect the temperature of the gas discharged at the turbine since the burning takes place some distance downstream. However, assuming a fixed area jet nozzle, the increase in discharge gas temperature in the tailpipe by virtue of the tailpipe fuel burning is accompanied by an increase in the static pressure of the gas in the tailpipe proportional to the temperature increase. This increase in discharge gas pressure results in a decrease in the pressure drop across the turbine which tends to decrease the turbine speed. Since most aircraft gas turbines of the type here considered are provided with speed governors, the decrease in turbine speed will cause the governor to increase the fuel flow to the combustion apparatus so as to return the turbine speed to the desired value. The increase in fuel flow to the main combustion apparatus produces a proportionate increase in the temperature of the gas passing through the turbine so that a turbine discharge gas temperature of 1,500° F. or higher may result by virtue of the tailpipe reheat burning when a fixed area jet nozzle is utilized. This high gas temperature at the turbine may be detrimental to the turbine structure and it is, therefore, desirable to provide means for insuring that the turbine discharge gas temperature does not vary from a constant predetermined safe level.

It has been found that the turbine discharge temperature can be controlled by varying the area of the jet nozzle. Increasing the area of the jet nozzle reduces the static pressure of the gas in the tailpipe, thus reducing the back pressure on the turbine, which in turn produces a tendency for the turbine to over-speed with a resultant reduction in fuel flow to the combustion apparatus as a result of the action of the governor. Thus, the turbine discharge temperature is maintained at the proper level with a new thrust level, however, being produced by virtue of the reheat fuel burning in the tailpipe. One system involving this mode of operation forms a portion of the subject matter described and claimed in patent application Serial No. 102,387 entitled "Gas Turbine Power Plant Having Variable Exhaust Area and Control System Therefor," filed June 30, 1949, now Patent No. 2,699,646, dated January 18, 1955, by John H. Baker and assigned to the same assignee as the present application. The present invention comprises an improvement over that system.

However it has also been found desirable to manually schedule the jet nozzle area and engine speed during "dry" or unaugmented operation to that the jet nozzle is wide open when the engine is initially started and it is then gradually closed as the speed is increased until it is fully closed at the maximum unaugmented speed. At full unaugmented thrust at maximum speed and closed jet nozzle, the turbine discharge temperature may exceed a safe level and it is, therefore, further desirable to provide means responsive to the turbine discharge temperature to automatically trim the position of the jet nozzle so as to override the manual scheduling so that the discharge temperature is prevented from exceeding a safe predetermined level. During augmented operation, increase in reheat fuel flow is accompanied by an increased tendency for the turbine discharge temperature to exceed the safe level necessitating that the jet nozzle be opened to maintain the actual discharge temperature at the desired level. Since in the reheat region, the maintenance of maximum thrust is required, it may also be desirable to relinquish the manual scheduling of the jet nozzle area and to provide for automatic variation of the jet nozzle area in accordance with the turbine discharge temperature to insure that the discharge temperature does not vary from a predetermined constant value during the tailpipe reheat fuel burning. Furthermore, it may be desirable to modulate the flow of reheat fuel in accordance with the turbine discharge temperature when the maximum area of the jet nozzle has been reached. In addition, in the case of rapid acceleration during the dry engine operation, it may be found desirable to provide for holding the jet nozzle open until the engine has come up to the speed called for by the throttle position.

An object of this invention is to provide an improved control system for an aircraft gas turbine power plant.

Another object of this invention is to provide an improved control system for an aircraft gas turbine power plant having reheat fuel burning for augmentation of thrust wherein the exhaust area is manually scheduled during dry engine operation and is automatically controlled in accordance with turbine discharge temperature at full unaugmented thrust and also during augmentation.

A further object of this invention is to provide an improved control system for aircraft gas turbines having reheat fuel burning for augmentation of thrust wherein the jet nozzle area is automatically controlled in accordance with turbine discharge temperature during augmentation and the reheat fuel flow is modulated in accordance with turbine discharge temperature when the maximum jet nozzle area has been reached.

Yet another object of this invention is to provide an improved control system for aircraft gas turbine power plants wherein the jet nozzle area is manually scheduled and wherein this scheduling is overridden during acceleration.

Further objects and advantages of this invention will become apparent and the invention will be better understood from the following description referring to the accompanying drawings, and the features of novelty which characterize the invention will be pointed out with particularity in the claims annexed to and forming part of this specification.

In accordance with this invention, an aircraft gas turbine having tailpipe reheat fuel burning for augmentation of thrust is provided with a variable area jet nozzle and an actuator mechanism for moving the nozzle. A servo system interconnects the main throttle of the power plant and the nozzle actuator mechanism to provide for manually scheduling the nozzle position during dry engine operation. Means such as thermocouples are positioned in the tailpipe of the turbine for sensing the turbine discharge temperature and the signal from the thermocouples is compared with a reference temperature signal to produce an error signal. This error signal is utilized to control the variable area jet nozzle actuator to automatically trim the position of the jet nozzle overriding the manual scheduling, so that the turbine discharge temperature does not exceed a predetermined value during dry engine operation. Duirng augmented operation of the engine, temperature control of the jet nozzle actuator is utilized exclusively to increase or decrease the jet nozzle area proportionate to an increase or decrease in turbine discharge temperature so that the turbine discharge temperature does not vary from a predetermined constant value. A further aspect of this invention provides for the transfer of the temperature responsive control from the variable area jet nozzle actuator to the reheat fuel regulator when the maximum area of the jet nozzle has been reached. A still further aspect of this invention provides means responsive to a characteristic of the speed governor for holding the jet nozzle open during rapid acceleration in the dry engine region.

Figure 1:
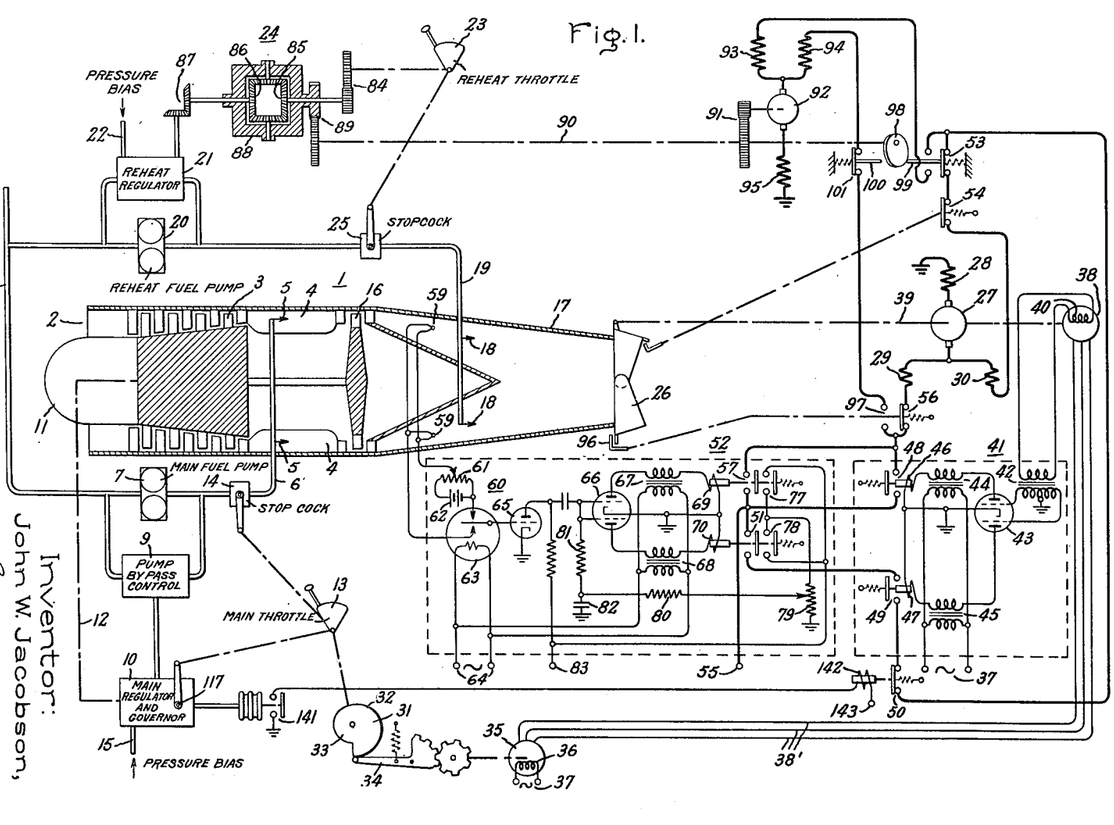
Fig. 1 is a schematic illustration of an aircraft gas turbine power plant provided with the improved control system of this invention.

Referring now to Fig. 1, there is shown an aircraft gas turbine power plant, generally identified as 1. Air is drawn in at inlet 2 and compressed by compressor 3. The main fuel is introduced into combustion chambers 4 by suitable nozzles 5, which are connected in parallel flow relation to a common fuel manifold 6. The fuel is conveyed to the nozzles 5 by a suitable pump 7 from a fuel supply (not shown) through fuel supply line 8. The output of the pump 7 is modulated by a pump by-pass control 9 which is in turn controlled by a regulator and speed governor mechanism 10, to be hereinafter more fully described. The speed governor portion of the regulator 10 is driven from the gear case 11 of the turbine 1 by a shaft shown schematically at 12. The control shaft of the regulator 10 is linked in any suitable manner to the main throttle 13, which is also linked to a shut-off valve 14 in the manifold 6.

In gas turbine power plants intended for use at sea level or at a substantially constant altitude, it is a relatively simple matter to supply the fuel requirements of the engine. However, in aircraft service, where the engine is required to operate over a wide range of altitude and where the fuel requirements vary as a function of the altitude, it is desirable to provide compensation to limit the output of the fuel pump in accordance with a preselected function of the atmospheric or some other pressure. Thus, the main fuel regulator 10 is provided with pressure bias from any desired source as shown at 15.

After the input air has been compressed by the compressor 3 and heated in the combustion chambers 4, it is expanded through the turbine 16 which drives the compressor 3. The hot gases discharged from the turbine 16 are exhausted through the tailpipe 17 and provide the thrust for propelling the aircraft.

In order to provide for reheat augmentation of thrust, additional fuel is introduced into the tailpipe 17 downstream from the turbine 16 through suitable nozzles 18 which are connected in parallel flow relation to a common fuel manifold 19. The reheat fuel is conveyed to the tailpipe nozzles 18 by a suitable pump 20 from the common fuel supply line 8. The output of the pump 20 is modulated by a reheat fuel regulator 21 which is also provided with a suitable pressure bias, as at 22. The control shaft of the reheat fuel regulator 21 is linked to a reheat fuel throttle 23 through a differential 24 as will be hereinafter described. The reheat fuel throttle 23 is also connected to a shut-off valve 25 in the reheat fuel manifold 19.

When the reheat fuel from the tailpipe nozzles 18 is burned in the tailpipe 17, the temperature of the gas in the tailpipe is increased accompanied by an increase in the static pressure of the gases in the tailpipe. This increase in static discharge gas pressure reduces the pressure drop across the turbine 16 tending to decrease its speed. The speed governor portion of the regulator 10 raises the main fuel flow through the nozzles 5 to return the speed to the correct value. The increased fuel-to-air ratio in the combustion chambers 4 results in an increase in the temperature of the gas discharged from the turbine 16, which temperature may be destructive of the turbine blades.

In order to reduce the excessive temperature of the gases discharged from the turbine 16 as a result of the burning of reheat fuel in the tailpipe 17, the arrangement now to be described is provided. The tailpipe 17 is provided with a suitable variable area jet nozzle 26 which is actuated by a series actuator motor 27 having a series clutch-brake coil 28 and two series field exciting windings 29 and 30 for either direction of rotation. It is desirable to manually schedule the area of the jet nozzle 26 and engine speed during dry engine operation and, therefore, the jet nozzle actuator motor 27 is controlled by the main throttle 13 by the following servo mechanism. The main throttle 13 is linked to a cam 31 which is provided with a decreasing surface portion 32 and a dwell surface portion 33. A follower 34 engages the cam 31 and drives "selsyn" transmitter 35. The "selsyn" transmitter 35 has its single phase winding 36 excited by a source of alternating current 37 (not shown) and its three-phase winding connected to "selsyn" receiver 38 by lines 38'. The "selsyn" receiver 38 is arranged on the drive shaft 39 of the jet nozzle actuator motor 27 and its single phase winding 40 is used to excite jet nozzle position amplifier unit 41 which in turn energizes the jet nozzle actuator motor 27. The jet nozzle position amplifier 41 includes a transformer 42 having its primary connected to the single phase winding 40 of the "selsyn" receiver 38 and its secondary connected to the grids of a suitable power tube 43. The plates of the tube 43 are respectively arranged in series with the secondaries of transformers 44 and 45, the primaries being respectively connected across the source of alternating current 37. Also arranged respectively in series with the plates of the tube 43 are relay coils 46 and 47 which respectively actuate open contacts 48 and close contacts 49. Acceleration contacts 50 and contacts 51 of the temperature control amplifier 52, both to be hereinafter described, are arranged in series with close contacts 49 of the jet nozzle position amplifier 41. Limit switch 53, to be hereinafter described, and the maximum closed limit switch contacts 54 of the variable area jet nozzle 26 are also arranged in series with the close contacts 49 of the jet nozzle position amplifier 41. The jet nozzle actuator motor 27 is arranged for energization from a source of actuator motor power 55 and thus temperature control contacts 51, close position contacts 49, acceleration contacts 50, and limit switch contacts 53 and 54 are arranged in series between the source of actuator motor power 55 and the close field winding 30 of the jet nozzle actuator motor 27. The maximum open limit switch contacts 56 of the variable area jet nozzle 26 are arranged in series with the open field winding 29 of the jet nozzle actuator motor 27 and contacts 57 of the temperature control amplifier 52 are arranged in parallel with the open contacts 48 of the jet nozzle position amplifier 41.

When the engine is initially started, assuming that the variable area jet nozzle 26 is not already at its maximum open position, the limit switch contacts 56 will be closed and, since the throttle 13 in its initial position calls for the maximum opened position of the variable area jet nozzle 26, an error signal from the "selsyn" receiver 38 will cause the open contacts 48 of the jet nozzle position amplifier 41 to close, energizing the open field winding 29 of the jet nozzle actuator motor 27 to drive the variable area jet nozzle 26 to its maximum open position. Advance of the main throttle 13, however, calls for a corresponding scheduled reduction in the area of the variable area jet nozzle 26. Assuming the limit switch 53 is closed, the maximum closed limit switch contacts 54 of the variable area jet nozzle 26 will also be closed. It may be also assumed that the acceleration contacts 50 are closed and, as will be hereinafter described, that the contacts 51 of the temperature control amplifier 52 are also closed. Thus, continued advance of the main throttle 13 calls for a reduction in the area of the variable area jet nozzle 26 resulting in a minus error signal from the "selsyn" receiver 38. This causes the relay coil 47 to be energized closing the contacts 49 to energize the close field winding 30 of the jet nozzle actuator motor 27. The jet nozzle actuator motor 27 then drives the variable area jet nozzle 26 in the close direction until the area called for by the main throttle 13 is reached at which point there will be no error signal on the "selsyn" receiver 38 causing the contacts 49 to open. The above-described operation produces the schedule shown in the dry engine portion of the chart of Fig. 2 wherein the variable area jet nozzle 26 is initially wide open and is then gradually closed as the engine speed is increased, there being a simultaneous increase in turbine discharge temperature.

Figure 2:
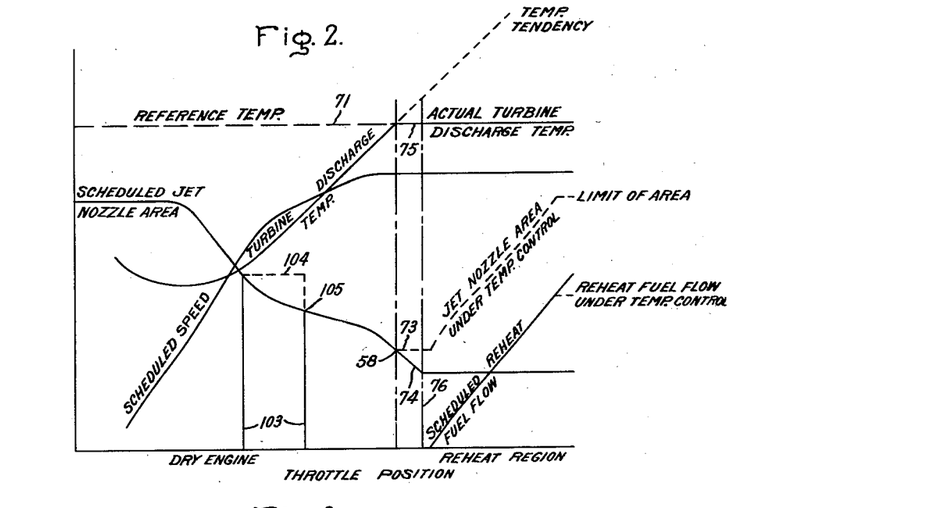
Fig. 2 shows the schedule of jet nozzle area, turbine discharge temperature and reheat fuel flow during dry and augmented engine operation.

It will be readily understood that the turbine discharge temperature may exceed a safe value, even during dry engine operation, for instance at the point 58 on the chart of Fig. 2 when the variable area jet nozzle 26 has been nearly driven to its maximum closed position. In order to provide for automatically trimming the variable area jet nozzle 26 to override the manual scheduling during dry engine operation, and for operating the variable area jet nozzle 26 in response to turbine discharge temperature during augmented operation, one or more low time constant temperature sensing units, such as thermocouples 59 are positioned in the tailpipe 17 intermediate the turbine 16 and the tailpipe nozzles 18. The thermocouples 59 measure substantially the average temperature of the gas discharged from the turbine prior to the introduction of the reheat fuel. The signal from the thermocouples 59 is received by the temperature amplifier unit 52, which energizes the jet nozzle actuator motor 27 responsive to the discharge temperature of the turbine 16 so that the variable area jet nozzle 26 is opened responsive to an increase in the discharge temperature above the safe level, overriding the manual scheduling, as will be hereinafter described.

In the event that the temperature sensing elements are thermocouples, it may be found desirable to compare the temperature from the thermocouples with a reference temperature signal, to amplify the error signal, and to use the amplified error signal to energize the nozzle actuator motor 27. In such a system, the thermocouples 59 are arranged in series with a constant reference voltage source 60 which may comprise potentiometer 61 and a battery 62. Thus, the direct current signal from the thermocouples 59 is compared with the voltage of the reference voltage source 60 which corresponds to the desired turbine discharge temperature and the result of this comparison, a plus or a minus or a zero error signal, is converted to direct current pulses by converter 63. The converter 63 may be a simple vibrator unit operated from a source of alternating current 64 so that a plus direct current error signal is changed to a series of plus pulses of the same frequency as the frequency of the alternating current source 64 while a minus error signal will be changed to a corresponding series of minus pulses displaced in phase by 180° from the plus pulses. The plus or minus pulses are impressed on the grid of a voltage amplifier 65 and the amplified error signal which is of one phase for a plus error signal and phase displaced by 180° for a minus error signal is impressed on both grids of a suitable power tube 66. The plates of the tube 66 are respectively arranged in series with the secondaries of transformers 67 and 68, the primaries being energized from the source of the alternating current 64. Also respectively arranged in series with the plates of the tube 66 and the secondaries of the transformers 67 and 68 are relay coils 69 and 70. The tube 66 and the transformers 67 and 68 comprise a phase discriminator in which the amplified plus or minus error signal is compared with the alternating current source 64. The resultant phase signal will energize either relay coil 69 responsive to a plus error signal or relay coil 70 responsive to a minus error signal. Contacts 57 are actuated by relay coil 69 and, as hereinbefore described, are arranged in parallel across open contacts 48 of the jet nozzle position amplifier 41. Contacts 51 are actuated by relay coil 70 and as hereinbefore described are arranged in series with close contacts 49 of the jet nozzle position amplifier 41. Thus, it will be seen that prior to the time that the variable area jet nozzle 26 has reached its maximum open position so that the limit switch contacts 56 are closed, either open contacts 57 of the temperature control amplifier unit 52 or open contacts 48 of the jet nozzle position amplifier 41 can energize the open field 29 of the jet nozzle actuator motor 27 to effect opening of the jet nozzle. However, in order to close the jet nozzle, assuming that acceleration contacts 50 and limit switch contacts 53 and 54 are closed, both close contacts 51 of the temperature control amplifier 52 and close contacts 49 of the jet nozzle position amplifier 41 must be closed.

Referring now to the point 58 on Fig. 2 where the variable area jet nozzle 26 has been driven to nearly maximum closed position during dry engine operation, further advance of the main throttle 13 will tend to produce a turbine discharge temperature higher than the reference temperature, identified as 71 on Fig. 2. Therefore, as the main throttle 13 is advanced past point 58, a still smaller jet nozzle opening is called for producing a minus error signal from the selsyn receiver 38 which will close contacts 49 of the jet nozzle position amplifier 41. At this point, however, there is a tendency for the turbine discharge temperature to exceed the reference level 71 resulting in a plus error signal in the temperature control amplifier 52. Thus, coil 69 will be energized closing contacts 57, and relay coil 70, which is energized responsive to a minus error signal, will not be energized so that contacts 51 are open. Therefore, the close field winding 30 of the jet nozzle actuator motor 27 will not be energized, as called for by the main throttle 13, but on the contrary, the open field winding 29 will be energized responsive to the plus temperature error signal. Thus, the manual scheduling by the main throttle 13 is overridden by the temperature control amplifier unit 52 so that the variable area jet nozzle 26 is automatically trimmed to prevent the turbine discharge temperature from exceeding the safe reference level. It will now be readily seen that the temperature responsive opening of the variable area jet nozzle 26 as shown at 73 on Fig. 2, overrides the manual scheduling as shown by the line 74, producing an actual turbine discharge temperature 75 at the reference level 71.

At the maximum dry thrust setting, as indicated by the line 76 on Fig. 2, the main throttle 13 calls for the variable area jet nozzle 26 to be fully closed. However, as described above, the turbine discharge temperature at this point may tend to exceed the reference level 71 causing the temperature control amplifier 52 to override the manual scheduling so that the variable area jet nozzle 26 has opened sufficiently to prevent the discharge temperature from exceeding the reference level. Therefore, at the point of maximum dry engine operation 76, there will be a close error signal from the selsyn receiver 38 causing contacts 49 to be closed. If at any time the discharge temperature drops below the reference level producing a minus error signal in the temperature control amplifier 52 closing the contacts 51, the circuit of the close field winding 30 of the jet nozzle actuator motor 27 is set up permitting immediate closing of the jet nozzle.

The first few degrees of advance of the reheat throttle 23 opens a valve to a pilot burner (not shown) and switches on the pilot burner ignition (also not shown) for the reheat nozzles 18. If the reheat throttle advance is continued, the reheat shut-off valve 25 is opened and the reheat fuel regulator 21 will begin to increase the fuel flow to the reheat fuel nozzles 18 to fire the reheat burner. This results in an immediate tendency for the temperature of the gas discharged from the turbine 16 to increase. As described above, any slight increase in the turbine discharge temperature above the reference level 71 established by the constant voltage source 60 is sensed by the thermocouples 59 and results in a plus error signal which energizes relay coil 69 closing contacts 57. Assuming that the variable area jet nozzle 26 has not reached its maximum open position and that, therefore, limit switch contacts 56 are still closed, the open field winding 29 of the jet nozzle actuator motor 27 will be energized causing the jet nozzle actuator motor 27 to further open the variable area jet nozzle 26 so that the turbine discharge temperature is maintained at the reference level. When the variable area jet nozzle 26 has opened a sufficient amount to return the turbine discharge temperature to the desired value, a zero error signal will be impressed on the converter 63 causing the relay coil 69 to be deenergized opening the contacts 57 to stop the jet nozzle actuator motor 27. When the clutch-brake coil 28 is deenergized, a brake mechanism (not shown) quickly stops the jet nozzle actuator motor 27.

As described above, a minus temperature error signal resulting from a turbine discharge temperature below the reference temperature 71, energizes relay coil 70 closing contacts 51. Since the main throttle 13 in its maximum position calls for the variable area jet nozzle 26 to be fully closed, the contacts 49 of the jet nozzle position amplifier 41 will be closed and, therefore, close field exciting winding 30 of the jet nozzle actuator motor 27 will be energized so that the jet nozzle actuator motor 27 starts to close the variable area jet nozzle 26. In this case also, when the temperature of the turbine discharge gas equals the reference temperature, a zero error signal will result which deenergizes the relay coil 70 opening the contacts 51 and stopping the jet nozzle actuator motor 27.

It will be readily apparent that the action of the temperature control amplifier unit 52 to energize the jet nozzle actuator motor 27 for opening or closing the variable area jet nozzle 26 occurs substantially simultaneously with the tendency for the temperature of the turbine discharge gas to increase or decrease during augmented operation. Thus, during augmentation, a tendency for the turbine discharge gas to increase or decrease is substantially simultaneously accompanied by a corresponding increase or decrease in the area of the variable area jet nozzle 26 so that the temperature increase or decrease is wiped out to maintain the turbine discharge temperature at substantially a constant level during augmentation. During dry engine operation, the jet nozzle area is primarily controlled by manual scheduling from the main throttle 13, the temperature control amplifier 52 providing for automatically trimming the jet nozzle area to prevent the turbine discharge temperature from exceeding the reference level.

It is desirable to provide a stabilizing network between the contacts 51 and 57 and the phase discriminator comprising the tube 66 and the transformers 67 and 68 to match the action of the temperature control amplifier unit 52 to the time constants of the gas turbine 1. As shown in Fig. 1, the stabilizing network may include contacts 77 and 78, respectively actuated by the relay coils 69 and 70, a variable stabilizing resistor 79 and a series resistor 81 and capacitor 82, and the source of amplifier power 83. Thus, when relay coil 69 is energized responsive to a plus error signal, contacts 77 are closed in addition to contacts 57 placing a predetermined voltage across the capacitor 82 determined by the setting of the potentiometer 79.

The values of the capacitor 82 and resistors 79 and 80 are proportioned so that the time constant of this RC circuit approximates the combined time constants of the engine and control system including; the gas turbine, the governor and main fuel system, the thermocouples, and the rate of tailpipe pressure change which is produced by the outputs of the control system, i. e., nozzle area and reheat fuel flow, which time constants are dependent upon the prevailing flight conditions including altitude, air speed, etc. The potentiometer 79 is set so that the feed back voltage taken therefrom is of the proper value to obtain the correct dropout time to equal the time constants enumerated above. It may be found desirable to provide two separate RC time constants; one during the time that the temperature control amplifier is used to control the variable area jet nozzle 26, and the other during the period that the temperature control amplifier is used to control the reheat fuel flow, as will be hereinafter described. Provision can be made for applying two different potentiometer voltages to the same RC network for the two different types of operation or two separate potentiometers and two RC networks may be used. In addition, it may be desirable to adjust the stabilizing signal to the flight condition and to secure this result, the potentiometer 79 may be connected to a device responsive to an appropriate pressure such as compressor inlet pressure or compressor discharge pressure. It will now be readily apparent that a voltage is impressed on the grids of the tube 66 which tends to oppose the error signal. A similar action, of course, takes place when the contacts 78 are closed by the action of relay coil 70 responsive to a minus error signal. The amplifier 52, described above, is shown and described in a more elaborate form in a copending application Serial No. 102,226, filed June 30, 1949, now Patent No. 2,699,524, dated January 11, 1955, by Ernest J. Jackson and Alan J. Gardiner, and assigned to the same assignee as the present application. The stabilization circuit of this amplifier, including the potentiometer 79 and capacitor 82, forms a portion of the subject matter of the Jackson and Gardiner application.

It may be found desirable to schedule the reheat fuel regulator 21 so that more reheat fuel will be delivered at the full reheat throttle position than can be burned in the tailpipe 17 under all conditions with the maximum area of the variable area jet nozzle 26 without exceeding the reference temperature. In this situation, a plus error signal will remain in the temperature control amplifier unit 52 after the maximum area of the variable area jet nozzle 26 has been reached. It is, therefore, desirable to transfer this plus error signal to the reheat fuel regulator 21 so that the reheat fuel flow can be reduced responsive to the plus error signal remaining after the maximum area of the variable area jet nozzle 26 has been reached. To accomplish this result, the reheat throttle 23 is linked, for instance through gears 84 to the input gear 85 of the differential 24. The output gear 86 is linked, as by gears 87, to the control shaft of the reheat fuel regulator 21. The cage 88 of the differential 24 is linked, as by gears 89, shaft 90, and gears 91 to series reheat regulator drive motor 92. The motor 92 is provided with series field exciting windings 93 and 94 and a series clutch-brake coil 95. When the reheat regulator drive motor 92 is not energized so as to drive the cage 88 of the differential 24, movement of the reheat throttle 23 is transmitted through the differential 24 to directly operate the control shaft of the reheat fuel regulator 21.

During reheat operation, when the variable area jet nozzle 26 reaches its maximum open position, it operates limit switch 96 opening normally closed limit switch contacts 56 and closing normally open contacts 97. The reheat regulator drive motor 92 is arranged to produce a maximum limit of rotation of the cage 88 of the differential 24, for instance by means of a cam 98 on the drive shaft 90 which actuates limit switches 99 and 100. Assuming that the cam 98 is in the position to actuate limit switch 99, normally closed contacts 101 of limit switch 100 will still be closed. Thus, if the advance of the reheat throttle 23 is continued past the point when the maximum open position of the variable area jet nozzle 26 has been reached, and if there is still a tendency for the turbine discharge gas temperature to be above the reference level, the remaining plus error signal will keep the contacts 57 of the relay coil 69 closed so that the field winding 94 of the reheat regulator drive motor 92 will be energized from the source of actuator motor power through contacts 57, 97, and 101. Therefore, the reheat regulator drive motor 92 will be operated to drive the cage 88 of the differential 24 in the proper direction to override or wipe out the advance of the reheat throttle 23 so that the reheat fuel regulator 21 is operated to produce the proper reheat fuel flow to maintain the turbine discharge temperature at the reference level.

Any movement of the reheat regulator drive motor 92 to override the advancing motion of the reheat throttle 23 responsive to a plus error signal on the relay coil 69 causes the cam 98 on the shaft 90 to move away from the limit switch 99 opening the contacts 53 in the circuit of the field winding 30 of the jet nozzle actuator motor 27 and closing contacts 102 in the circuit of the field exciting winding 93 of the reheat regulator actuator drive motor 92. Continued advance of the reheat throttle 23 is accompanied by continued operation of the reheat regulator drive motor 92 driving the cage 88 of the differential 24 to override the increased reheat fuel flow called for by the reheat throttle 23 to maintain the turbine discharge temperature constant. The limit switch 100 is actuated by the cam 98 to open the contacts 101 to stop the reheat regulator drive motor 92 at a predetermined minimum fuel flow.

It will now be readily apparent that a minus error signal which would normally cause energization of the field exciting winding 30 of the jet nozzle actuator motor 27 to increase the area of the variable area jet nozzle 26 is transferred to the field exciting winding 93 of the reheat regulator drive motor 92. Thus, if the reheat throttle 23 is retarded producing a tendency for the turbine discharge temperature to decrease, the resultant minus error signal energizes relay coil 70 closing contacts 51. As described above, the contacts 49 of the jet nozzle position amplifier 41 are closed since the main throttle 13 is calling for a maximum closed position of the variable area jet nozzle 26. Assuming that acceleration contacts 50 are closed, the field exciting winding 93 of the reheat regulator drive motor 92 is energized by the actuator motor power 55 through contacts 51, 49, 50 and 102. The reheat regulator drive motor 92 then operates to drive the cage 88 of the differential 24 in the opposite direction to override the retarding action called for by the reheat throttle 23 to maintain the reheat fuel flow at the proper level to keep the turbine discharge temperature at the reference level. When the reheat regulator drive motor 92 has completed its limit of travel, the cam 98 actuates the limit switch 99 opening the contacts 102 and closing the contacts 53. This transfers the temperature control back to the jet nozzle actuator motor 27. Further continued retardation of the reheat throttle 23 producing a minus error signal is then accompanied by operation of the jet nozzle actuator motor 27 to decrease the area of the variable area jet nozzle 26 to maintain the turbine discharge temperature at the reference level.

Assuming that the reheat throttle 23 is completely retarded, the main throttle 13 remaining at its maximum position, there may still be a tendency for excessive turbine discharge temperature in which event the temperature control amplifier 52 will keep the variable area jet nozzle 26 open the necessary amount to maintain the temperature at the desired level. Subsequent retardation of the main throttle 13 calls for an increase in jet nozzle area, as shown in Fig. 2. This causes contacts 48 of the jet nozzle position amplifier 41 to be closed energizing the jet nozzle actuator motor 27 to open the variable area jet nozzle 26.

Figure 3:
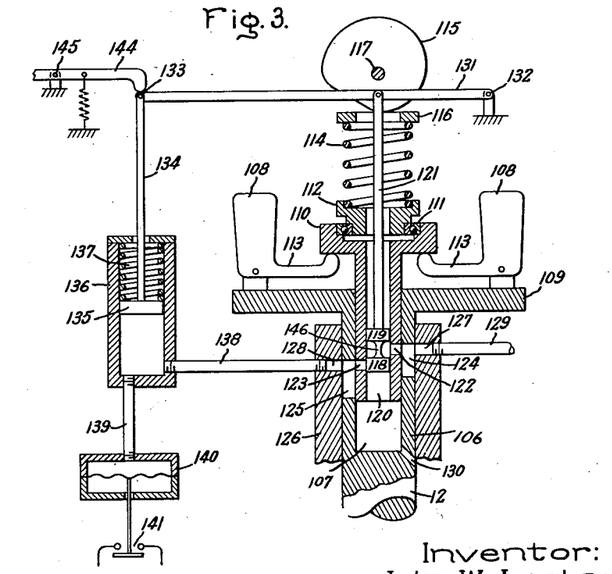
Fig. 3 is a fragmentary side elevataional view, partly in section, illustrating a part of the speed governor mechanism.

It will be readily understood that in the event of a rapid main throttle advance during dry engine operation, the engine speed will lag behind that called for by the throttle. It is, therefore, desirable to provide means for holding the variable area jet nozzle 26 at its previous position until the engine speed has reached the called for value, at which point the jet nozzle may be allowed to close to the position called for by the main throttle scheduling. This can be seen with reference to Fig. 2 where the area change 103 may be considered to be a rapid throttle advance. The jet nozzle area should, therefore, be maintained constant as the throttle is advanced, as shown by the line 104 until the engine speed has reached the called for value, at which point the jet nozzle area may be allowed to assume its called for value as shown at 105. In order to accomplish this result, the arrangement now to be described is provided. Referring to Fig. 3, there is shown a part of the main regulator and governor unit 10 in which the drive shaft 12, driven by the turbine 1 through gear case 11, is provided with an extension portion 106 having a cylindrical cavity 107 formed therein. A pair of fly-ball weights 108 are secured to an annular flange portion 109 extending from the extension portion 106 of the shaft 12. Sleeve 110 is slidably arranged in the cavity 107 of the extension portion 106 and is carried by suitable bearings 111 mounted in a ring portion 112. The fly-ball weights 108 are provided with leg portions 113 which bear on the lower surface of flange on sleeve 110. A coil spring 114 bears on the upper surface of the ring portion 112 and is compressed by a cam 115 which bears on a cap member 116. The cam 115 is mounted on shaft 117 which is actuated by the main throttle 13. Two lands 118 and 119 are arranged in the cylinder 120 in the interior of the sleeve 110 and are mounted on a common operating rod 121. Ports 122 and 123 are provided in the wall of the cylindrical member 110 and slots 124 and 125 are provided in the wall of the extension 106 communicating with the ports 122 and 123 and the cylindrical member 110. The extension portion 106 of the shaft 12 is journaled in a bearing 126 having openings 127 and 128 communicating with the slots 124 and 125 in the extension portion 106. High pressure oil is provided by a pump (not shown) driven by the shaft 12 through oil line 129 which is seated in the port 127 in the bearing 126. A drain opening 130 is formed in the bottom of the cavity 107 of the extension portion 106. The operating rod 121 of the valve with lands 118 and 119 is connected to lever 131 which has a fixed pivot at 132. The other end 133 of the lever 131 is secured to operating rod 134 of piston 135 which operates in cylinder 136. A coil spring 137 in the cylinder 136 biases the piston 135 into a downward position. An oil line 138 communicates with the cylinder 136 and the opening 128 in the bearing 126. Another oil line 139 communicates with the bottom of the cylinder 136 and a pressure switch 140 which actuates the contacts 141. Referring to Fig. 1, the contacts 141 are arranged in series with a relay coil 142 and a source of control power 143, the coil 142 actuating the acceleration contacts 50. A spring-biased regulator operating lever 144 pivoted at 145 bears on the end 133 of the lever 131 and operates the remaining portion (not shown) of the main fuel regulator 10.

With the main throttle 13 in its initial position, and the engine operating at a constant speed, the cam 115 is in the position shown in Fig. 3. In this position, the high pressure oil from the line 129 enters the opening 127, the slot 124, and the port 122 into the space 146 between the lands 118 and 119, the land 118, however, closing the port 123, trapping oil under pressure in the cylinder 136 under piston 135 and the connecting passages. Initial advance of the main throttle 13 causes the cam 115 to compress the spring 114 biasing the weights 108 inward and moving the cylindrical member 110 downward so that the port 123 communicates with the slot 125 and the cavity 107 in the extension portion 106. The spring 137 in the cylinder 136 then forces the piston 135 downward forcing oil from the cylinder 136 through the line 138, the opening 128, slot 125, and port 123 into the cavity 107 and out of the drain 130. The downward motion of the piston 135 and its operating rod 134 causes regulator operating lever 144 to be actuated to operate the main fuel regulator so as to increase the main fuel flow. In addition, the lever 131 and operating rod 121 are moved downward moving the lands 118 and 119 down so that the space 146 between the pistons communicates with the two ports 122 and 123 in the wall of the sleeve 110. This admits oil to the cylinder 136. In the meantime, the engine is responding to the increased fuel flow provided by the lever 144 causing the weights 108 to move out to raise sleeve 110 and ring member 112 compressing spring 114. The oil introduced into the cylinder 136 raises the piston 135 to reduce the flow of main fuel and to raise the lever 131 and operating rod 121 and lands 118 and 119 to close the port 123. By this action, an equilibrium is established with the proper flow of main fuel to maintain the speed called for by the main throttle 13.

It will be seen from the foregoing, that any rapid advance of the main throttle 13 causing rotation of the cam 115 is immediately accompanied by downward movement of the piston 135 to exhaust oil from the cylinder 136. This then produces a low oil pressure in the cylinder 136 which causes the pressure switch 140 to close the contacts 141 thus, energizing relay coil 142 to open the acceleration contacts 50. It will now be readily understood from the foregoing, that the opening of the acceleration contacts 50 opens the circuit of the field winding 30 of the jet nozzle actuator motor 27 preventing the scheduled closing of the variable area jet nozzle 26. As the main fuel flow approaches the value required to stabilize at the speed called for by the main throttle 13, the oil pressure in the cylinder 136 again opens the pressure switch 140 opening the contacts 141 to cause the acceleration contacts 50 to close thus, permitting the jet nozzle actuator motor 27 to drive the variable area jet nozzle 26 closed to the scheduled position called for by the main throttle 13.

While thermocouples are disclosed as the temperature sensing element, it will be readily understood that other temperature sensing elements may be utilized such as a bimetallic strip or a spectrum analyzing unit. The temperature sensing unit can be used to control a different servo system for actuating the variable area jet nozzle 26 rather than the reference temperature system described above. It may also be found desirable to utilize temperatures other than the turbine discharge temperature to override the scheduled operation of the variable area jet nozzle during dry engine operation and to control the area during augmentation, for instance, the turbine inlet temperature or the temperature of the metal or turbine blades or tailpipe. While the thermocouples are disclosed as being positioned in the tailpipe intermediate the turbine and the point of introduction of reheat fuel, the temperature sensing element for sensing turbine discharge temperature may be located elsewhere, for instance, on the turbine blades. The potentiometer 61 across the battery 62 may be connected to a manual control in the pilot's cockpit, thus enabling the pilot to control the thrust of the dry engine by setting a lower reference voltage. While separate main and reheat throttles 13 and 23 are shown, it will be readily understood that a single throttle can be utilized in a manner such as shown for instance in application Serial Number 129,074 of John H. Baker and John W. Jacobson, filed November 23, 1949, and assigned to the assignee of the present application.

It will now be readily apparent that the control system described herein provides the desired jet nozzle area for maximum thrust during dry engine operation and in addition insures that the turbine discharge temperature does not exceed a safe level. Furthermore, provision is made for holding the variable area jet nozzle in the proper position during rapid acceleration. During augmentation, this system insures that the turbine discharge temperature does not vary from a predetermined constant value. From the safety standpoint, if the reheat nozzles do not light or are in some way extinguished, the variable area jet nozzle will automatically assume a position which will never give less than the maximum dry engine thrust.

While I have illustrated and described a particular embodiment of this invention, modifications thereof will occur to those skilled in the art. I desire it to be understood, therefore, that the invention is not to be limited to the particular arrangement disclosed, and I intend in the appended claims to cover all modifications which do not depart from the spirit and scope of the invention.

What I claim as new and desire to secure by Letters Patent of the United States, is:

1. A control system for a gas turbine power plant of the reaction type comprising fuel regulating means, manual means connected to said fuel regulating means for varying the setting thereof, a discharge area varying means for said power plant, means connecting said manual means to said discharge area varying means for actuation thereof in accordance with a predetermined schedule of discharge area with respect to the setting of said fuel regulating means under operating conditions below a predetermined maximum power plant temperature, power plant temperature responsive means, means for connecting said temperature responsive means to said discharge area varying means for taking over control of said discharge area independent of fuel flow under operating conditions where the predetermined maximum temperature has been achieved and the scheduled discharge area is less than required to limit the temperature to the predetermined maximum to automatically maintain said maximum.

2. A control system for a gas turbine power plant of the reaction type comprising a lever positionable to control power plant output, power plant exhaust area varying means, exhaust area scheduling means connected to said lever and connectable to said area varying means for varying the exhaust area according to a predetermined schedule as a function of the position of said lever, power plant temperature responsive means connectable to said area varying means for actuation thereof in an opening direction to limit the temperature of said power plant to a predetermined maximum and for actuation in a closing direction at power plant temperatures below said predetermined maximum, and means arranged between said scheduling means and said temperature responsive means and said area varying means for connecting either said scheduling means or said temperature responsive means to independently actuate said area varying means in the opening direction and for connecting said area varying means for actuation in the area reducing direction only in response to area reducing signals from both said scheduling means and said temperature responsive means.

3. A control system for a gas turbine power plant of the reaction type comprising a lever positionable to control power plant output, power plant exhaust area scheduling means connected to said lever for varying the exhaust area according to a predetermined schedule as a function of the position of said lever, power plant temperature responsive control means for varying the exhaust area at a predetermined maximum temperature to maintain said maximum temperature for positions of said lever which schedule exhaust areas smaller than those required to maintain said maximum, separately actuatable means for respectively opening and closing said exhaust area, said scheduling means and said temperature responsive control means each including separate actuating devices for said exhaust area opening and closing means, said area opening actuating devices being connected to said opening means for independent actuation thereof by either said scheduling means or said temperature responsive means, said area closing actuating devices being connected to said closing means for dependent concurrent actuation thereof by both said scheduling means and said temperature responsive means.

4. A control system for a gas turbine power plant of the reaction type comprising a lever positionable to control power plant output, power plant exhaust area scheduling means connected to said lever for varying the exhaust area according to a predetermined schedule as a function of the position of said lever, power plant temperature responsive control means for varying the exhaust area at a predetermined maximum temperature to maintain said maximum temperature for positions of said lever which schedule exhaust areas smaller than those required to maintain said maximum, an electrical exhaust area varying device having separate circuits for energization thereof in the opening and closing directions, said scheduling means and said temperature responsive control means each including separate circuit making devices for exhaust area opening and closing actuation, said area opening circuit making devices being connected in parallel in said area varying device opening circuit for independent actuation thereof in the opening direction by either said scheduling means or said temperature responsive means, and said area closing circuit making devices being connected in series in said area varying device closing circuit for dependent actuation thereof in the closing direction by both said scheduling means and said temperature responsive means.

5. In an aircraft gas turbine power plant, means for varying the discharge area of said power plant, means responsive to manual operation for actuating said discharge area varying means independent of temperature but in accordance with a predetermined schedule with respect to the desired output of said power plant, means including a thermocouple positioned in said power plant for sensing the discharge temperature of said turbine, and means operable in response to a signal from said thermocouple and operatively connected to said area varying means for automatically trimming said area varying means to override said manually actuated operation thereof upon attainment of a predetermined maximum turbine discharge temperature so that the temperature does not exceed the predetermined maximum value.

6. In an aircraft gas turbine power plant, a variable area jet nozzle for said power plant, means for actuating said variable area jet nozzle, means responsive to manual operation and independent of temperature for energizing said actuating means to operate said variable area jet nozzle in accordance with a predetermined schedule, means including a thermocouple positioned in said tailpipe for sensing the discharge temperature of said turbine, means for comparing a reference temperature signal with the signal from said thermocouple to produce an error signal, and means responsive to said error signal for energizing said actuating means to open or close said variable area jet nozzle proportional to an increase or decrease in said turbine discharge temperature overriding said manually actuated operation whereby said turbine discharge temperature does not exceed a predetermined value and does not vary from said predetermined value when said manually actuated operation calls for higher temperatures.

7. A control system for a gas turbine power plant of the reaction type including reheat fuel burning for augmentation of thrust comprising a lever positionable to control power plant output, power plant exhaust area scheduling means connected to said lever for varying the exhaust area according to a predetermined schedule as a function of the position of said lever, power plant temperature responsive control means for varying the exhaust area at a predetermined maximum temperature to maintain said maximum temperature for positions of said lever which schedule exhaust areas smaller than those required to maintain said maximum, separately actuatable means for respectively opening and closing said exhaust area, said scheduling means and said temperature responsive control means each including separate actuating devices for said opening and closing means, said opening actuating devices being connected to said opening means for independent actuation thereof by either said scheduling means or said temperature responsive means, said area closing actuating devices being connected to said closing means for dependent concurrent actuation thereof by both said scheduling means and said temperature responsive means, separately actuatable means for respectively raising and lowering the amount of reheat fuel flow, means operable upon attainment of the full open position of said exhaust area to transfer the connections of said opening actuating devices from said opening means to said reheat fuel lowering means, and means actuatable upon initial lowering of said reheat fuel for transferring the connections of said closing actuating devices from said closing means to said reheat fuel flow increasing means.

8. A control system for a gas turbine power plant of the reaction type having reheat fuel burning for augmentation of thrust comprising a lever positionable to control power plant output, power plant exhaust area scheduling means connected to said lever for varying the exhaust area according to a predetermined schedule as a function of the position of said lever, power plant temperature responsive control means for varying the exhaust area at a predetermined maximum temperature to maintain said maximum temperature for positions of said lever which schedule exhaust areas smaller than those required to maintain said maximum, an electrical exhaust area varying device having separate circuits for energization thereof in the opening and closing directions, said scheduling means and said temperature responsive control means each including separate circuit making devices for exhaust area opening and closing actuation, said area opening circuit making devices being connected in parallel in said area varying device opening circuit for independent actuation thereof in the opening direction by either said scheduling means or said temperature responsive means, and said area closing circuit making devices being connected in series in said area varying device closing circuit for dependent actuation thereof in the closing direction by both said scheduling means and said temperature responsive means, an electrical reheat fuel flow adjusting device having separate circuits for energization thereof in the fuel flow raising and lowering directions, a limit switch arranged for actuation upon maximum opening of said exhaust area to transfer the connections of said area opening circuit making devices from said opening circuit to said reheat fuel lowering circuit, and means operable in response to initial movement of said reheat fuel adjusting means in the reheat fuel lowering direction for transferring the connections of said closing circuit making devices from said closing circuit to said fuel raising circuit.

9. In an aircraft gas turbine power plant, means for varying the exhaust area of said power plant, means responsive to manual operation for actuating said exhaust area varying means, means for regulating the flow of fuel, means responsive to manual operation for adjusting said fuel regulator means, means responsive to turbine discharge temperature for automatically trimming said exhaust area varying means whereby said turbine discharge temperature does not exceed a predetermined value, and means responsive to an acceleration condition of said main fuel regulating means for preventing a decrease in said exhaust area during acceleration of said turbine.

10. In an aircraft gas turbine power plant, means for varying the area of the jet nozzle of said tailpipe, means for regulating flow of fuel and for governing the speed of said power plant, means responsive to manual operation for actuating said fuel regulating means and said jet nozzle area varying means in accordance with a predetermined schedule, means for sensing the discharge temperature of said turbine, means operable in response to a signal from said temperature sensing means and operatively connected to said jet nozzle area varying means for automatically trimming said jet nozzle area varying means to override said manually actuated operation thereof whereby said turbine discharge temperature does not exceed a predetermined value, and means responsive to an off-speed signal from said fuel regulating and speed governing means for preventing a decrease in the area of said jet nozzle during acceleration of said turbine.

11. In an aircraft gas turbine power plant, a variable area jet nozzle for said power plant, means for actuating said variable area jet nozzle, means for regulating the flow of main fuel and for governing the speed of said power plant, means responsive to manual operation for actuating said main fuel regulating means and for energizing said jet nozzle actuating means in accordance with a predetermined schedule, means for sensing the discharge temperature of said turbine, means operable in response to a signal from said temperature sensing means for energizing said jet nozzle actuating means for opening and closing said variable area jet nozzle proportional to an increase or decrease in said turbine discharge temperature overriding said manually actuated operation whereby said turbine discharge temperature does not exceed a predetermined value, and means responsive to a pressure obtained from said governor indicating an off-speed signal for rendering said jet nozzle actuating means ineffective to close said jet nozzle during acceleration of said turbine.

12. In an aircraft gas turbine power plant having exhaust reheating for augmentation of thrust, means for varying the exhaust area of said power plant, means responsive to manual operation for actuating said exhaust area varying means, means for regulating the flow of main fuel, means responsive to manual operation for operating said main fuel regulating means, means responsive to the discharge temperature of said turbine for automatically trimming said exhaust area varying means to override said manually actuated operation thereof whereby said turbine discharge temperature does not exceed a predetermined value during unaugmented operation and does not vary from said predetermined value during augmentation, means for regulating the flow of reheat fuel, manually actuated means for operating said reheat fuel regulator means, said temperature responsive means being adapted to control said reheat fuel regulating means to modulate the flow of reheat fuel when the maximum limit of exhaust area has been reached, and means responsive to an acceleration condition of said main fuel regulator for preventing a decrease in said exhaust area during acceleration of said turbine.

13. In an aircraft gas turbine power plant having tailpipe reheat fuel burning for augmentation of thrust, means for varying the area of the jet nozzle of said tailpipe, means for regulating the flow of main fuel and for governing the speed of said power plant, means responsive to manual operation for actuating said main fuel regulating means and said jet nozzle area varying means in accordance with a predetermined schedule, means for sensing the discharge temperature of said turbine, means operable in response to a signal from said temperature sensing means and operatively connected to said jet nozzle area varying means for automatically trimming said jet nozzle area varying means to override said manually actuated operation thereof whereby said turbine discharge temperature does not exceed a predetermined value during unaugmented operation and does not vary from said predetermined value during augmentation, means for regulating the flow of reheat fuel, manually actuated means for operating said reheat fuel regulating means, means for operating said reheat fuel regulating means to override the fuel flow called for by said manually actuated operating means, said trimming means being adapted to control said reheat fuel regulator overriding means to modulate the flow of reheat fuel when the maximum limit of the jet nozzle area has been reached, and means responsive to an off-speed signal from said main fuel regulator and governor means for preventing a decrease in said jet nozzle area during acceleration of said turbine.

14. In an aircraft gas turbine power plant having tailpipe reheat fuel burning for augmentation of thrust, a variable area jet nozzle for said tailpipe, means for actuating said variable area jet nozzle, means employing a hydraulic control pressure for regulating the flow of main fuel and for governing the speed of said power plant, means responsive to manual operation for actuating said main fuel regulating means and for energizing said jet nozzle actuating means in accordance with a predetermined schedule, means for sensing the discharge temperature of said turbine, means operable in response to a signal from said temperature sensing means for energizing said jet nozzle actuator means for opening and closing said variable area jet nozzle proportional to an increase or decrease in turbine discharge temperature overriding said manually actuated operation whereby said turbine discharge temperature does not exceed a predetermined value during unaugmented operation and does not vary from said predetermined value during augmentation, means for regulating the flow of reheat fuel, manually actuated means for operating said reheat fuel regulating means, means for operating said reheat fuel regulating means to override the fuel flow called for by said manually actuated operating means, said opening and closing means being adapted to control said reheat fuel regulator overriding means to modulate the flow of reheat fuel when the maximum limit of jet nozzle area has been reached, and means responsive to a control pressure of said governor means indicating an off-speed signal for rendering said jet nozzle actuator means ineffective to close said variable area jet nozzle during acceleration of said power plant.

15. In an aircraft gas turbine power plant having tailpipe reheat fuel burning for augmentation of thrust, means for varying the area of the jet nozzle of said tailpipe, means for regulating the flow of fuel, means responsive to manual operation for actuating said fuel regulating means and said jet nozzle area varying means in accordance with a predetermined schedule, means for sensing the discharge temperature of said turbine, means operable in response to a signal from said temperature sensing means for automatically trimming said jet nozzle area varying means to override said manually actuated operation thereof whereby said turbine discharge temperature does not exceed a predetermined value during unaugmented operation and does not vary from said predetermined value during augmentation, and means responsive to an acceleration condition of said fuel regulator for preventing a decrease in said jet nozzle area during acceleration of said gas turbine.

16. A control system for a gas turbine power plant of the reaction type comprising a regulator for governing turbine speed and fuel flow, a lever positionable to control the setting of said regulator, power plant exhaust area scheduling means connected to said lever for varying the exhaust area according to a predetermined schedule as a function of the position of said lever, exhaust area closing means connected for actuation by said scheduling means, said regulator including turbine speed measuring means, and means interposed between said scheduling means and said exhaust area closing means operable at speeds measured by said speed measuring means below the speed required by the setting of said regulator for disconnecting said scheduling means from said closing means.

17. A control system for a gas turbine power plant of the reaction type comprising a regulator for governing speed and fuel flow including turbine speed measuring means, a lever connected to said regulator and movable to change the setting thereof, power plant exhaust area scheduling means connected to said lever for varying the exhaust area according to a predetermined schedule as a function of the position of said lever, separately actuatable means for respectively opening and closing said exhaust area, said scheduling means including separate actuating devices for said exhaust area opening and closing means, said regulator including an actuating device for said exhaust area closing means operable upon attainment of a turbine speed measured by said speed measuring means equal to the speed required by the setting of said regulator, said area opening actuating device being connected to said opening means for actuation thereof by said scheduling means, said area closing actuating devices being connected to said closing means for dependent concurrent actuation thereof by said scheduling means and said regulator.

18. A control system for a gas turbine power plant of the reaction type comprising a regulator for governing turbine speed and fuel including turbine speed measuring means, a lever connected to said governor and movable to change the setting thereof, power plant exhaust area scheduling means connected to said lever for varying the exhaust area according to a predetermined schedule as a function of the position of said lever, an electrical exhaust area varying device having separate circuits for energization thereof in the opening and closing directions, said scheduling means including separate circuit making devices for exhaust area opening and closing actuation, said regulator including a circuit making device for exhaust area closing actuation operable upon attainment of a turbine speed at least as high as that required by the setting of said governor, said area opening circuit making device being connected in said area varying device opening circuit for actuation thereof, said area closing circuit making devices being connected in series in said area varying device closing circuit for dependent actuation thereof in the closing direction by said scheduling means and said regulator.

19. A control system for a gas turbine power plant of the reaction type comprising a regulator for governing turbine speed and fuel flow including turbine speed measuring means, a lever connected to said regulator and movable to change the setting thereof, power plant exhaust area scheduling means connected to said lever for varying the exhaust area according to a predetermined schedule as a function of the position of said lever, power plant temperature responsive control means for varying the exhaust area at a predetermined maximum temperature to maintain said maximum temperature for positions of said lever which schedule exhaust areas smaller than those required to maintain said maximum, separately actuatable means for respectively opening and closing said exhaust area, said scheduling means and said temperature responsive control means each including separate actuating devices for said opening and closing means, said regulator including an actuating device for said closing means operable upon attainment of a turbine speed measured by said speed measuring means at least as high as the speed required by the setting of said regulator, said area opening actuating devices being connected to said opening means for independent actuation thereof by either said scheduling means or said temperature responsive means, said closing actuating devices being connected to said closing means for dependent concurrent actuation thereof by said scheduling means and said temperature responsive means and said regulator.

20. A control system for a gas turbine power plant of the reaction type comprising a regulator for governing turbine speed and fuel including turbine speed measuring means, a lever connected to said regulator and movable to change the setting thereof, power plant exhaust area scheduling means connected to said lever for varying the exhaust area according to a predetermined schedule as a function of the position of said lever, power plant temperature responsive control means for varying the exhaust area at a predetermined maximum temperature to maintain said maximum temperature for positions of said lever which schedule exhaust areas smaller than those required to maintain said maximum, an electrical exhaust area varying device having separate circuits for energization thereof in the opening and closing directions, said scheduling means and said temperature responsive control means each including separate circuit making devices for exhaust area opening and closing actuation, said regulator including a circuit making device for exhaust area closing actuation operable upon attainment of a turbine speed at least as high as that required by the setting thereof, said area opening circuit making devices being connected in parallel in said area varying device opening circuit for independent actuation thereof in the opening direction by either said scheduling means or said temperature responsive means, said area closing circuit making devices being connected in series in said area varying device closing circuit for dependent actuation thereof in the closing direction by said acheduling means and said temperature responsive means and said regulator.

21. A control system for a gas turbine power plant of the reaction type including reheat fuel burning for augmentation of thrust comprising a regulator for governing turbine speed and fuel flow including turbine speed measuring means, a lever connected to said regulator and movable to change the setting thereof, power plant exhaust area scheduling means connected to said lever for varying the exhaust area according to a predetermined schedule as a function of the position of said lever, power plant temperature responsive control means for varying the exhaust area at a predetermined maximum temperature to maintain said maximum temperature for positions of said lever which schedule exhaust areas smaller than those required to maintain said maximum, separately actuatable means for respectively opening and closing said exhaust area, said scheduling means and said temperature responsive control means each including separate actuating devices for said opening and closing means, said regulator including an actuating device for said closing means operable upon attainment of a turbine speed measured by said speed measuring means at least as high as the speed required by the setting of said regulator, said area opening actuating devices being connected to said opening means for independent actuation thereof by either said scheduling means or said temperature responsive means, said closing actuating devices being connected to said closing means for dependent concurrent actuation thereof by said scheduling means and said temperature responsive means and said regulator, separately actuatable means for respectively raising and lowering the amount of reheat fuel flow, means operable upon attainment of the full open position of said exhaust area to disconnect said area opening actuating devices from said opening means to transfer the connections of said opening actuating devices from said opening means to said reheat fuel lowering means, and means actuatable by initial movement of said reheat fuel lowering means for transferring the connections of said closing actuating devices from said closing means to said reheat fuel flow increasing means.

22. A control system for a gas turbine power plant of the reaction type including reheat fuel burning for augmentation of thrust comprising a regulator for governing turbine speed and fuel flow including turbine speed measuring means, a lever connected to said regulator and movable to change the setting thereof, power plant exhaust area scheduling means connected to said lever for varying the exhaust area according to a predetermined schedule as a function of the position of said lever, power plant temperature responsive control means for varying the exhaust area at a predetermined maximum temperature to maintain said maximum temperature for positions of said lever which schedule exhaust areas smaller than those required to maintain said maximum, an electrical exhaust area varying device having separate circuits for energization thereof in the opening and closing directions, said scheduling means and said temperature responsive control means each including separate circuit making devices for exhaust area opening and closing actuation, said regulator including a circuit making device for exhaust area closing actuation operable upon attainment of a turbine speed at least as high as that required by the setting thereof, said area opening circuit making devices being connected in parallel in said area varying device opening circuit for independent actuation thereof in the opening direction by either said scheduling means or said temperature responsive means, said area closing circuit making devices being connected in series in said area varying device closing circuit for dependent actuation thereof in the closing direction by said scheduling means and said temperature responsive means and said regulator, an electrical reheat fuel flow adjusting device having separate circuits for energization thereof in the fuel flow raising and lowering directions, a limit switch arranged for actuation upon maximum opening of said exhaust area to transfer the connections of said area opening circuit making devices from said opening circuit to said reheat fuel lowering circuit, and means operable in response to initial movement of said reheat fuel adjusting means in the reheat fuel lowering direction for transferring the connections of said area closing circuit making devices from said closing circuit to said fuel raising circuit.

References Cited in the file of this patent

UNITED STATES PATENTS

| | | |
|---|---|---|
| 2,095,991 | Lysholm | Oct. 19, 1937 |
| 2,457,595 | Orr | Dec. 28, 1948 |
| 2,498,939 | Bobier | Feb. 28, 1950 |
| 2,514,248 | Lombard et al. | July 4, 1950 |
| 2,520,434 | Robson | Aug. 29, 1950 |
| 2,520,967 | Schmitt | Sept. 5, 1950 |
| 2,564,127 | Orr | Aug. 14, 1951 |